United States Patent

Stout

[15] 3,656,771
[45] Apr. 18, 1972

[54] FLEXIBLE SEAL ASSEMBLY FOR SPIGOT AND BELL CONDUIT JOINT

[72] Inventor: John C. Stout, Portland, Oreg.
[73] Assignee: Irrigation Accessories Co., Portland, Oreg.
[22] Filed: Dec. 11, 1970
[21] Appl. No.: 97,158

[52] U.S. Cl. .......................... 277/207 A, 285/345, 285/379
[51] Int. Cl. ........................................................ F16j 15/02
[58] Field of Search.................. 285/345, 231, 230, 110, 379; 277/207, 207 A

[56] References Cited

UNITED STATES PATENTS

| | | | |
|---|---|---|---|
| 2,403,364 | 7/1946 | Hertzell et al. | 277/207 A |
| 2,719,348 | 10/1955 | Desnos | 277/207 A |
| 3,266,137 | 12/1965 | Trnka | |

Primary Examiner—Robert I. Smith
Attorney—L. R. Geisler

[57] ABSTRACT

A resilient sealing sleeve has one portion inserted in the end of the spigot member and the remaining portion, of larger outer diameter, extending into the bell portion of the joint. The interior wall of the sleeve has an annular recess to accommodate an annular pressure member which keeps the two portions of the sleeve pressed outwardly against the spigot and bell members respectively. The shoulder on the sleeve between the smaller and larger outer diameter portions is slotted to act as an air seal upon the development of vacuum within the conduit.

6 Claims, 4 Drawing Figures

JOHN C. STOUT
INVENTOR

ATTY.

FLEXIBLE SEAL ASSEMBLY FOR SPIGOT AND BELL CONDUIT JOINT

BACKGROUND OF THE INVENTION

Various types of flexible and resilient seals have heretofore been developed for sealing the connection between the members in a spigot and bell joint, but, as far as known, these have been designed for being inserted entirely, or largely, in between the spigot and the bell members, thus extending around the outside of the spigot on the inside of the bell and compressed in between the two members. Such seals have generally required specially formed ends either in the bell member or spigot member or in both for seating the seal and for holding it in place, and also have necessitated the forming of the bell member with a sufficiently large inner diameter to provide space for the seal between the outer wall of the spigot and the bell.

An object of the present invention is to provide a practical and reliable seal assembly, adapted for use with a straight spigot end member and a simple bell end member with the latter merely of ample size to receive the spigot end without unnecessarily extensive clearance; and thus the present invention is designed for use with conduit pipes, and particularly plastic pipe, of easy manufacture and inexpensive in cost.

SUMMARY OF THE INVENTION

The seal assembly includes a sleeve of rubber or other suitable water-impervious, compressible, resilient material, having approximately one-half of its length formed with an outer diameter of such size as to permit it to be pressed into the end of the spigot member of the two pipe ends forming the joint, and with the remaining portion formed with a sufficiently larger outer diameter so that it can be pressed into the bell of the companion pipe end, thus causing the two portions of the sleeve to have a sealing fit in the spigot and bell members respectively at the joint. To maintain a tight sealing pressure of the two portions of the sleeve against both the spigot end and the adjacent bell, without having to depend on any internal pressure within the pipeline, a cylindrical band or ring of metal or rigid plastic is pressed into the interior of the sealing sleeve. The inner wall of the sleeve is formed with a recess extending in from the bell end portion of the sleeve almost to the opposite end of the inner wall of the sleeve to receive this cylindrical pressure band. The two ends of the sleeve beyond the ends of the pressure band are outwardly beveled to reduce the resistance of the sleeve to the flow in either direction in the pipeline. In order to prevent the possibility of any air seeping into the joint from the outside by being sucked inbetween the bell member and the engaging outer wall of the sleeve, in the event a vacuum should develop in the pipeline, the shoulder on the outer wall of the sleeve, marking the division between the smaller and larger outer diameter portions of the sleeve, is formed with an opposing V-shaped slot which, when engaged by air under pressure, will exert a tendency to open and thereby increase the pressure of the sleeve against the wall of the bell and render the seal even more airtight at that point.

Figure 1:
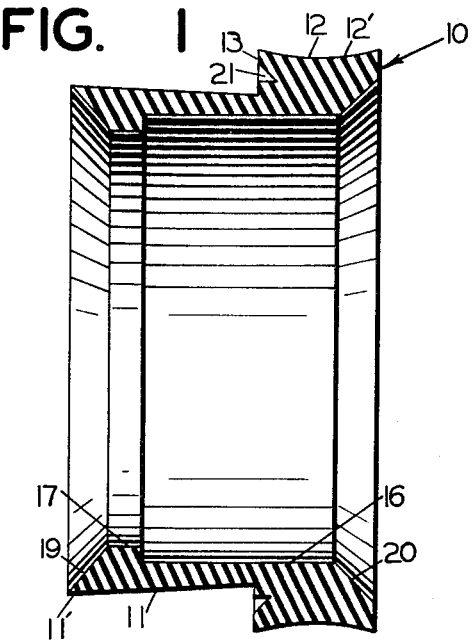
FIG. 1 is a sectional elevation of the sealing sleeve by itself, the section being taken along the longitudinal center line.
Figure 3:
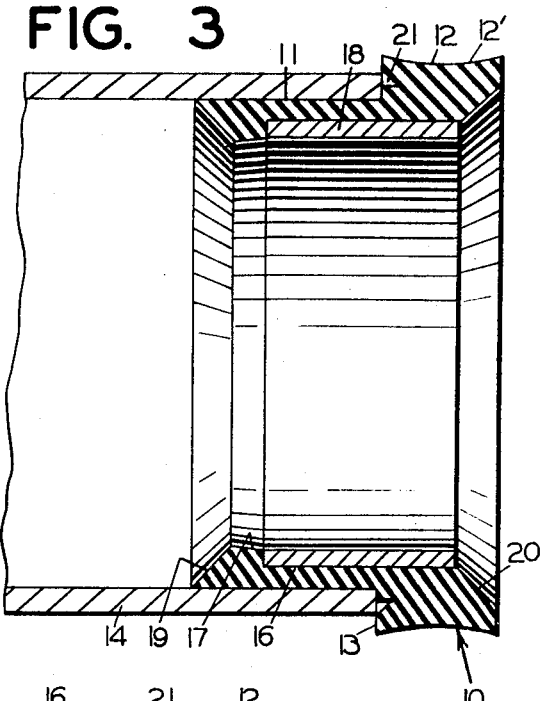
FIG. 3 is a sectional elevation showing the sealing sleeve in place in the end of the spigot member of a pipe joint and the pressure band in place in the sleeve.
Figure 4:
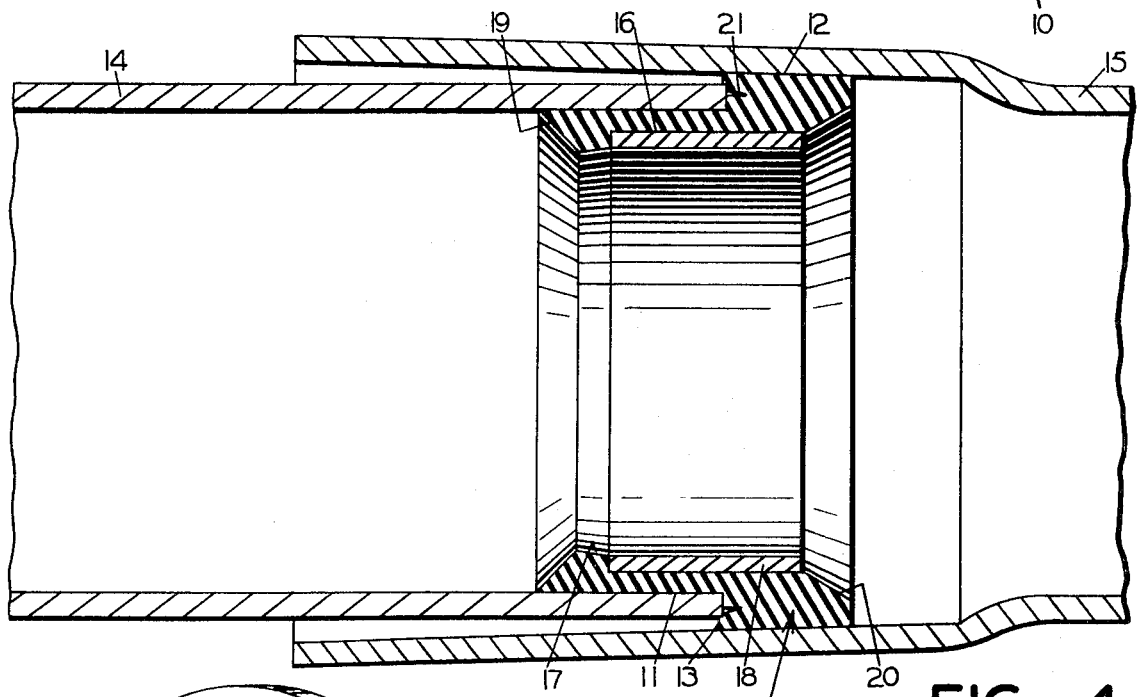
FIG. 4 is a corresponding sectional elevation of the pipe joint and seal assembly with the bell member set in place over the sealing sleeve and the spigot member.
Figure 2:
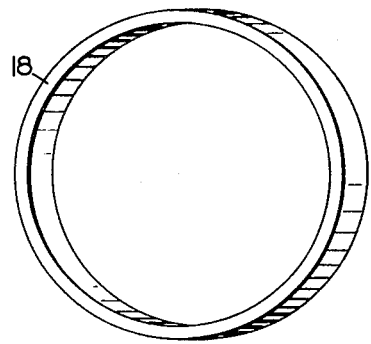
FIG. 2 is a perspective view of the cylindrical pressure band by itself, drawn to a smaller scale.

The main sealing member of the assembly consists 4) a sleeve 10, shown best in FIG. 1, of rubber or other compressible resilient material suitable for a flexible fluid-proof seal. The outer wall of the sleeve 10 is formed with a generally smaller diameter surface portion 11 and a generally larger diameter surface portion 12, with a shoulder 13 separating these two portions. The smaller outer diameter portion 11 of the sleeve is designed to be pressed into the end of the spigot member 14 (FIGS. 3 and 4) of the pipe joint, and the larger outer diameter portion 12 is designed to be pressed into the bell member 15 (FIG. $) of the pipe joint when the bell member is set in place over the spigot member.

Preferably the smaller outer diameter portion 11 of the sleeve 10 is formed with the outer diameter increasing gradually toward the termination of this end portion, which end portion is indicated at 11' in FIG. 1. The purpose of this is to aid in increasing the sealing pressure against the interior of the spigot at this end of the sleeve.

Preferably, also, the outer wall of the larger diameter portion 12 of the sleeve 10 is formed with a varying diameter causing this outer wall section, when not pressed into the bell member, to assume the somewhat concave formation shown at 12' in FIG. 1, to aid in increasing the sealing pressure against the bell member at each end of this larger outer diameter portion 12 of the sleeve.

The inside wall of the sealing sleeve 10 is formed with an annular recess 16 (FIG. 1) extending in from the portion 12 of the sleeve and terminating at a flat annular ridge 17 a short distance from the other end of the interior of the sleeve. The purpose of this annular recess 16 is to provide a seat for a cylindrical pressure band 18 which is pressed into the sleeve 10 after the sleeve is inserted into the spigot member 14. The cylindrical pressure band 18 maintains a firm sealing pressure of the sleeve 10 against the wall of the spigot member 14, (and also similarly against the engaged portion of the bell member 15, when the pipe joint is completely set up). Thus the sealing pressure of the sleeve against the interior of the spigot and bell members is not dependent upon the pressure otherwise present in the pipeline.

In place of the solid cylindrical pressure band 18 it would be possible to use a spring band of plastic or metal to exert a constant outward pressure in the sleeve 10. The solid cylindrical band or ring 18 as illustrated is considered preferable, but it is to be understood that either may be employed in the carrying out of this invention.

The ends of the sleeve 10 are both beveled outwardly, as shown at 19 and 20, to minimize the resistance offered by the sleeve to the flow through the pipeline in either direction.

Under certain conditions vacuum may develop within a pipeline, and in such a situation there would be a tendency for air to be sucked into the pipeline through the joint, a condition which is undesirable. Any air sucked into the pipeline through the bell and spigot joint with the sleeve 10 mounted in place would have to leak in between the outer surface of the portion 12 of the sleeve and the surrounding wall of the bell member. To render even less likely the possibility of air being drawing in between these opposed surfaces and thus sucked into the pipeline through the spigot and bell joint, the wall of the shoulder 13 of the sleeve 10 is provided with a substantially V-shaped slot 21 (FIG. 1) forming a converging pair of lips which are normally brought together under the pressure of the sleeve portion 12 against the inside surface of the bell member. However, should any strong inward suction of air occur in between the spigot and surrounding end of the bell member, the pressure of the air against the shoulder 13 of the sleeve would then have a tendency to force the slot 21 open but this in turn would only increase the pressure of the sleeve at the location of the outer lip of the slot against the confining wall of the bell and correspondingly render the seal between the sleeve and the bell still tighter at this point and render the passage of air therethrough even less possible.

As will be apparent, the entire sealing assembly is very simple in construction and is very quickly and easily mounted in place, the portion 11 of the sleeve 10 first being inserted in the spigot member, the pressure band 18 thus being placed in the sleeve, and finally the companion bell member being slid into position over the sleeve portion 12 and the end of the spigot member of the joint. Also, as previously mentioned, this sealing assembly is specially designed to be used with ordinary spigot and bell members, particularly in conduits and pipelines of plastic, and with simple spigot and bell joint having minimum telescoping tolerance. The invention eliminates the necessity of requiring any grooves to be provided in either member of the joint for seating a sealing ring or the necessity of providing any external sealing clamps.

I claim:

1. In a conduit joint of the character described consisting of a spigot member and a bell member encompassing the end of the spigot member, a sealing assembly including a resilient, flexible sleeve extending from the interior of the spigot member into the bell member, the first portion of said sleeve being of smaller outer diameter than the remaining second portion of said sleeve to enable said first portion to fit snugly in said spigot member and to enable said second and larger diameter portion to fit snugly in said bell member when the conduit joint is put together, the inside wall of said sleeve having a recess and an internal member in said recess extending annularly around on the interior of said sleeve and exerting outward pressure on said first and said second portions of said sleeve against said spigot and said bell members respectively.

2. The sealing assembly of claim 1 with said internal member consisting of a solid, cylindrical band pressed into said recess in said sleeve.

3. The sealing assembly of claim 2 with said recess extending in from the end of said sleeve in said bell member and terminating near the opposite end of said sleeve in said spigot member and an annular internal ridge in said opposite end of said sleeve at the termination of said cylindrical band, the radial thickness of said ridge corresponding approximately to the radial thickness of said cylindrical band, and with the ends of said sleeve beveled outwardly.

4. The sealing assembly of claim 1 with a shoulder on the outer wall of said sleeve between said first and said second mentioned portions, and with the outer diameter of said first mentioned portion increasing slightly from said shoulder to the termination of said first mentioned portion.

5. The sealing assembly of claim 1 with the outer diameter of said second portion of said sleeve decreasing slightly from each end of said second portion of said sleeve to the middle of said second portion to form a somewhat concave annular outer surface on said second portion of said sleeve.

6. The sealing assembly of claim 1 with a shoulder on the outer wall of said sleeve between said first and said second mentioned portions, and with said shoulder provided with a slot having a top lip for increasing the sealing pressure of said sleeve against said bell member in the event of increased external air pressure being exerted against said shoulder as the result of suction developing in the conduit and tending to draw air into the conduit joint.

* * * * *